Dec. 30, 1930.  K. D. CHAMBERS  1,786,518
MEANS FOR LIGHTING MOTOR VEHICLES
Original Filed July 1, 1924  4 Sheets-Sheet 1
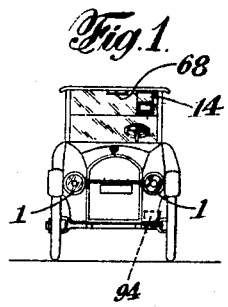
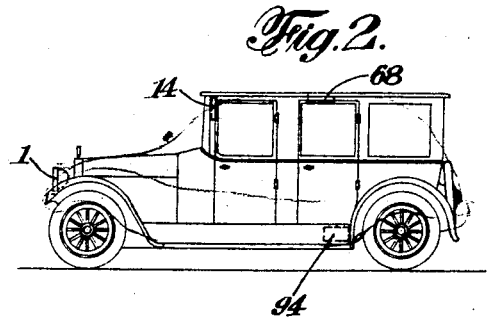
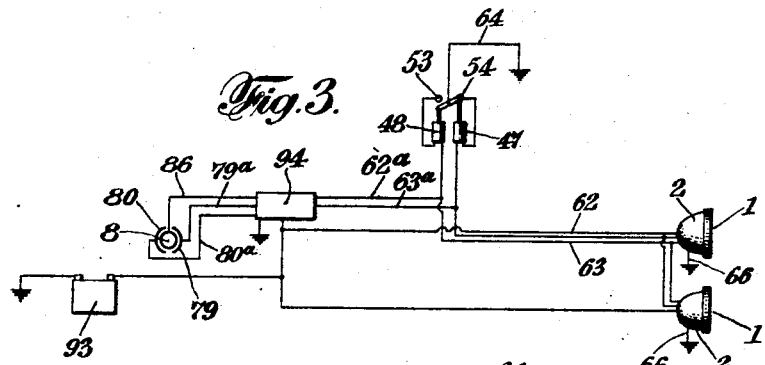
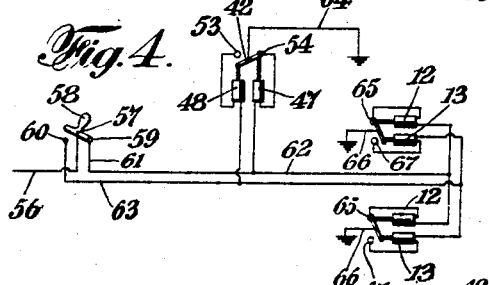
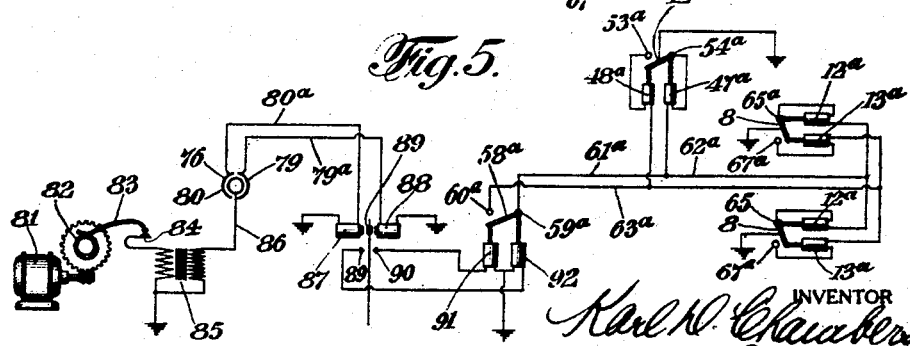

Dec. 30, 1930.  K. D. CHAMBERS  1,786,518
MEANS FOR LIGHTING MOTOR VEHICLES
Original Filed July 1, 1924   4 Sheets-Sheet 2
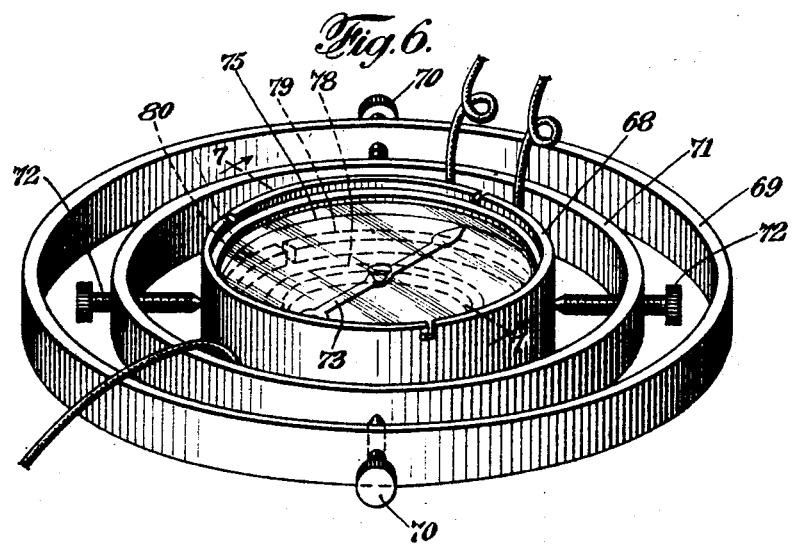
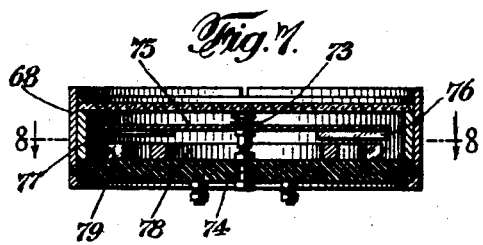
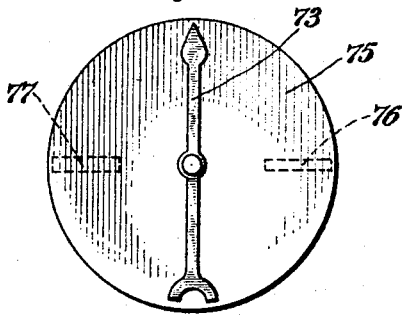
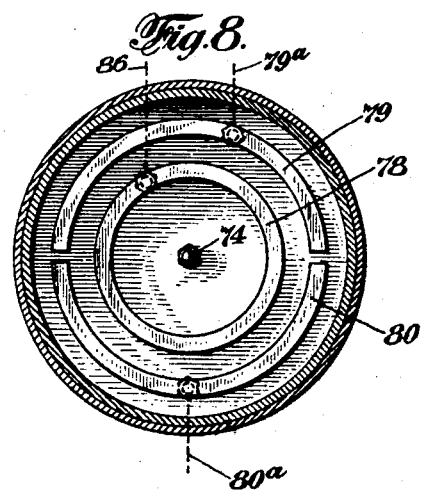
INVENTOR
Karl D. Chambers
BY
Prindle, Wright, Neal & Beau
ATTORNEY Dec. 30, 1930.  K. D. CHAMBERS  1,786,518
MEANS FOR LIGHTING MOTOR VEHICLES
Original Filed July 1, 1924    4 Sheets-Sheet 3
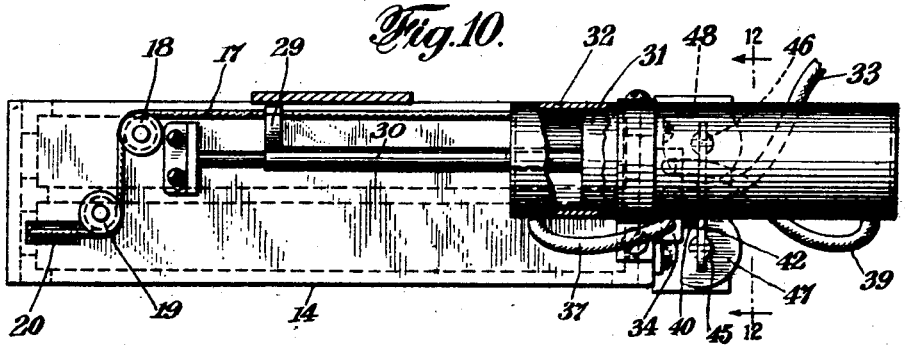
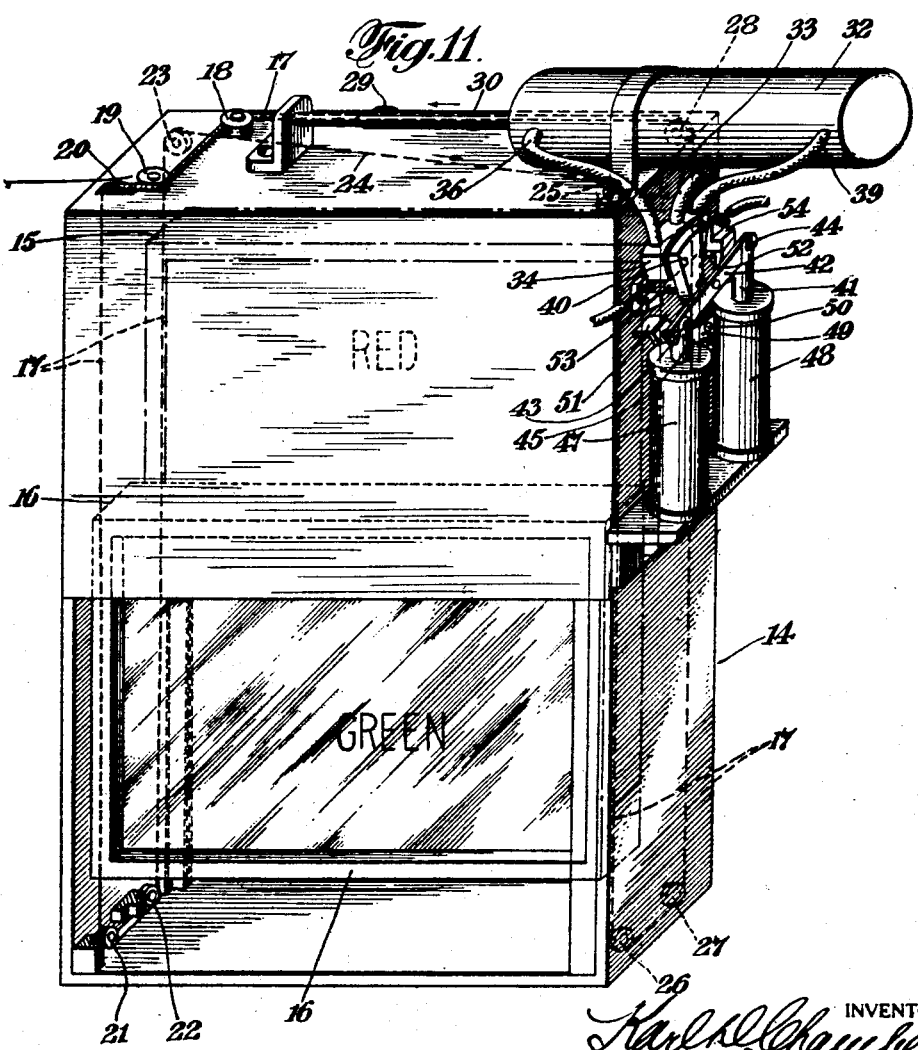

Dec. 30, 1930.  K. D. CHAMBERS  1,786,518
MEANS FOR LIGHTING MOTOR VEHICLES
Original Filed July 1, 1924    4 Sheets-Sheet 4
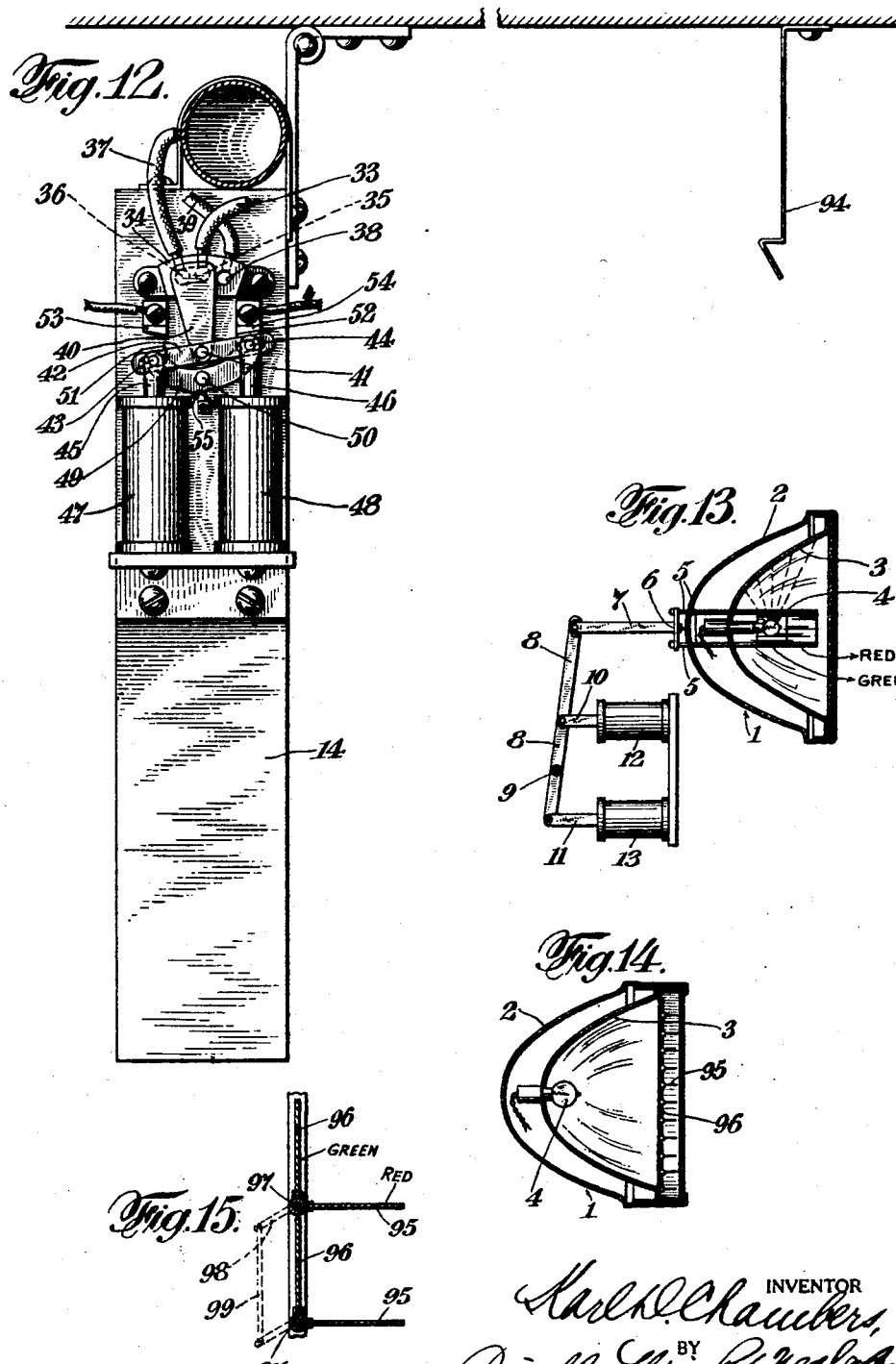

Patented Dec. 30, 1930

1,786,518

UNITED STATES PATENT OFFICE

KARL D. CHAMBERS, OF MONTGOMERY, ALABAMA

MEANS FOR LIGHTING MOTOR VEHICLES

Application filed July 1, 1924, Serial No. 723,539. Renewed September 14, 1929.

The object of my invention has been to provide a means for lighting motor vehicles, either land or water, so that the driver of each vehicle may adequately see an approaching vehicle and the roadway or neighboring objects without being blinded by the light of such vehicle. According to my invention, each vehicle has means for projecting a particular kind of selected light such as light of a particular wave length or polarization, and has a device by which any other form of light is prevented from reaching the driver's eyes as intensely as that which is reflected back to him by the light of his own vehicle. By causing each vehicle to use a different kind or selected or predominating light, with a corresponding filter or other protective device, the driver of each vehicle will be protected from blinding by the light projected from the other vehicle, and at the same time will be enabled to see that vehicle and the roadside by his selected light. Preferably each vehicle is provided with means for projecting either of two such kinds of light, and with two such protective devices so that each vehicle may always be able to use a different kind of light from that used by the other.

To such ends my invention consists in the means for lighting motor vehicles hereinafter specified.

While I have chosen as an illustration of my invention those embodiments thereof which are the best ones known to me, my invention is capable of embodiment in many different forms, and the illustrated forms are therefore only typical and my invention is not to be confined thereto.

As a particular illustration of my invention: two vehicles A and B are each provided with means for projecting at will either red light or blue-green light, and with corresponding colored filters so arranged that the driver may look through the one corresponding to the light which his vehicle is projecting. If vehicle A is going north and by rules of the road its lights are throwing out red light, and the vehicle B is going south and by said rules its lights are throwing out blue-green light, the driver of vehicle A will be viewing red light through a red color filter when reflected back from the opposite vehicle, which will allow him to see the light from his own lights which is reflected back, but which will largely or entirely prevent the blue-green light which is being sent out by the lights of vehicle B from passing through it and affecting his eyes. Conversely, the driver of vehicle B will be using his blue-green filter and this will enable him to see, when it is reflected back to him, the blue-green light which his vehicle is throwing out but will prevent him from seeing the red light of the opposing vehicle.

Any kind of light which can be differentiated partially or wholly by a filter or other selective device will serve the purpose of my invention such as light of a particular wave length or plane of polarization. For instance, it is only necessary that in the light projected from a vehicle at any given time, rays predominate of a kind which will be obstructed by the filter or other obstructive device of the opposing vehicle. It is therefore not necessary that the two kinds of light projected from the two vehicles be wholly different. Furthermore, two different kinds of polarized light can be used in the same manner as different kinds of colored light, by making the plane of polarization of each vehicle different at a given time and using, instead of the colored filters, polarizers having corresponding differences in the plane of polarization.

The filter or protective device for allowing the light as reflected by other objects to pass through it, should be of very low absorption for the particular wave lengths or particular plane of polarization selected, but it should offer great resistance or absorption to the passing of rays of light in different wave lengths or polarization.

The selection of wave lengths desired may be accomplished by the use of filters, prisms, mirrors, or other apparatus known to general scientific, optical, and illuminating practice, or by a combination of these. The light can be polarized by reflection or by a combination of reflection and refraction; or wave lengths can be selected for propagation of the directions desired by transmitting white light through filters or prisms with a suitable and well-understood arrangement of absorption bands, prisms, or mirrors, or by the use of luminous gases or solids giving off colored lights. Any other complementary colors or sets of colors than the red and blue-green lights above mentioned or other combinations of colors can be used for the purposes of my invention.

In illustrating the details of the mechanism to aid in the practice of my invention, I shall first show one by which the change from one to the other color is effected manually, and shall then illustrate a mechanism by which it shall be automatically performed in accordance with the points of a compass. In both of such embodiments red light and blue-green light will be understood to be used. The blue-green light might be considered negative red and vice versa.

In the accompanying drawings,

Figures 1 and 2 are front and side elevations of an automobile showing diagrammatically the location of a compass for controlling the color of the light emitted from the head lights, the filter box, head lights, and control box, etc.;

Fig. 3 is a general wiring diagram of the apparatus shown in Figures 1 and 2;

Fig. 4 is a wiring diagram of the entire system when constructed for operation by hand;

Fig. 5 is the complete wiring diagram for control by a compass of the color emitted;

Fig. 6 is a perspective view of the compass set in gimbals;

Fig. 7 is a vertical sectional view taken on line 7—7 of Fig. 6;

Fig. 8 is a horizontal sectional view taken on line 8—8 of Fig. 7, having the needle disk removed;

Fig. 9 is a top plan view of said needle disk;

Figures 10 and 11 are respectively a top view partly broken away and a perspective view of the filter box and operating mechanism;

Fig. 12 is an end view of the filter box;

Fig. 13 is a sectional view of a head light with a color filter for controlling the color emitted, and Figures 14 and 15 are sectional views of the head light with another form of color screen.

Referring now to the figures of the drawing, the automobile is provided with head lights 1, Figures 1 and 2, which, as shown in Fig. 13, have an outer shell 2 containing a parabolic reflector 3 in the focus of which is located a light 4. A cylindrical filter surrounds the light and is supported upon parallel rods 5 which pass through openings in the casing and the parabolic reflector 3, and the filter is provided with a red portion and a green portion, either of which may be brought into position to control the light passing from the bulb to the reflector by shifting the rods 5 horizontally outward or inward relative to the reflector. A cross-bar 6 connects the rods 5 and has a link 7 that is connected, as by a pin and slot connection, with a lever 8, the latter being pivoted upon a stationary fulcrum 9 and having armatures 10 and 11 and solenoids 12 and 13 pivoted to the lever. Thus by energizing one or the other solenoid, the filter can be shifted so as to bring either its red or its green portion into operative relation to the lamp. In actual practice, the solenoids 12 and 13 and their cooperating parts would preferably be placed inside the shell of the reflector.

A red and a green filter are also provided for the driver to look through, and means are provided for placing that one of said filters on a level with the driver's eyes which corresponds with the light which is being projected from his head lights. The said filters in the present instance are mounted in a filter box 14 which is shown in Figures 10, 11, and 12, and in the present instance are shown as mounted in rectangular frames which are movable in vertical guideways, formed in the box, the red light being in the frame 15 and the green light in the frame 16. I have provided a simple means for moving the said filters simultaneously by the use of a single cord 17 which is mounted upon pulleys in the filter box in the following manner. The cord is continuous, and considering the portion thereof which extends horizontally across the top of the filter box, it passes horizontally around the pulley 18, as seen in Figures 10 and 11, and horizontally forward to the pulley 19, as seen in said figures, and then over the vertical pulley 20 and downward past the left-hand end of the green filter frame to which it is fastened. At the bottom of the filter box it passes under the vertical pulley 21 and horizontally backward and under a similar pulley 22, whence it passes upward to vertical pulley 23 at the top of the filter box and in doing so passes the red filter frame 15 to which it is fastened. The cord then passes diagonally across the top of the filter box, as indicated by the line 24, and over the vertical pulley 25 near the front thereof, and then passes downward and under the vertical pulley 26 at the bottom thereof and, in doing so, passes along the right-hand end of the green filter frame 16 and is secured thereto. On passing under the pulley 26, the cord passes horizontally to the rear of the filter box and under vertical pulley 27, and thence upward to pulley 28 at the top and rear of the filter box, and in doing so passes by the right-hand end of the red filter box and is secured thereto. From the pulley 28, the cord passes to the left along the top of the filter box to the point at which the description of it began. An arm 29 carried by a hollow piston rod 30 is secured to the cord, so that the cord may be actuated by a piston 31 which is contained in a cylinder 32, to provide a motor for shifting one of the filters to the lower position in the filter box and removing the other from such position, so that the desired one may be in the lower position opposite the driver's eyes in order that he may see through it. In order to create a difference in pressure between the two ends of the cylinder, I desire to use the vacuum pressure of the engine, and for that purpose connect the intake manifold of the engine by a tube 33 with a passage in a block 34 that opens into a port 35 in the plane face of the block. A port 36 is provided on one side of port 35, the port 36 being connected by a tube 37 with the left-hand end of the cylinder, and a port 38 on the other side of the port 35 being connected by tube 39 with the right-hand end of said cylinder. A valve is provided in the form of a plate 40 mounted on a pivot 41 on the box, the valve fitting against the side or face of the block 34 and having a recess on its under side that is sufficient to connect two of such ports when it overlies the same, as shown in Fig. 12. The valve carries a cross bar 42 having slots on each end which receive pins 43 and 44 that are respectively carried by plungers 45 and 46 of solenoids 47 and 48. Said pins also engage slots in the opposite end of a rock arm 49 that is mounted on a pivot 50 on the box, the ends of said arm being bent over to respectively form contact points 51 and 52 that are respectively adapted to engage with contacts 53 and 54 which are fixed upon the box. Projections are formed on the lower edge of the arm 49 to engage with a spring 55, so as to tend to throw contacts 51 or 52 into firm engagement with the contacts 53 or 54.

Thus energizing one or the other of the solenoids 47 or 48 will position the valve 40 either to connect the port 35 with the port 36 or to connect it with the port 38 and thus to throw either the red or the green filter into position. The action of the solenoids will also bring one of the movable contacts 51 or 52 into engagement with the corresponding fixed contacts 53 or 54, the rock arm 49 being operated through a lost-motion device, such as slots in said arm into which the pins 43 and 44 extend, so as not to break the contact until the end of the stroke has all but been reached. In the diagrams the rock arm 49 is omitted and only the lever 42 is shown as though it contacted with the contacts 53 and 54 as the only purpose of the rock arm is to get the said delayed action.

In the manually controlled form of my apparatus, the diagram of which is shown in Fig. 4, the positive pole of the storage battery is connected by wire 56 with pivot 57 and hand lever 58. The arms of said lever are adapted to engage either the fixed contact 59 or, 60. The contact 59 is connected by wire 61 with the solenoid 47 of the filter box, and also by wire 62 with the solenoids 12 for shifting the filters in the head lights. The contact 60 is connected by the wire 63 with the solenoid 48 of the filter box and also with the solenoids 13 of the head lights. The other end of solenoid 47 is connected with the stationary contact 54 and the corresponding end of the solenoid 48 is connected with the stationary contact 53. The pivot of the rock arm 49 is grounded by the wire 64. The far ends of the winding of the solenoids 12 are connected to stationary contacts 65 which may be connected to the ground by the lever 8 through a wire 66 that is connected with the pivot of the latter, and the corresponding ends of the solenoids 13 are connected to stationary contacts 67 which are also adapted to be engaged by said lever.

In the operation of this manually controlled form of my invention shown in Fig. 4, the figure shows the condition just after the hand lever 58 has been thrown and before the solenoids have had time to act. If the hand lever 58 be thrown to the right so as to make connection with the stationary contact 59, the current from the positive pole of the battery will flow through the wire 61 to the solenoids 47 and 13 energizing them, and the solenoid 47 will shift the valve 40 to connect the ports 35 and 38, thus causing the piston in the cylinder of the control box to be shifted to the right as seen in Figures 10 and 11 and to raise the green screen above and lower the red one to the level of the driver's eyes, and also causing the solenoid 12 to shift the lever 8 so as to cause the red portion of the cylindrical filter to come into position for the light and so that the head lights will project red light either predominantly or entirely as may be desired. If the opposing car is projecting green light, the driver of the first mentioned car will be screened from that light by his red filter, but his own red light will be reflected back from the opposing car, the roadway, etc. and will enable him to adequately see them. When the driver of the first mentioned car happens to be driving in the opposite direction or meets a car that is showing red light, he has only to shift his hand lever 58 to the opposite position and the current from the positive pole of the battery will flow through the contact 60 and wire 63 to the solenoids 48 and 12 and green light will be projected from his head lights and the green filter thrown into position for him to see through.

In order to make my apparatus automatic, I have provided a form, shown diagrammatically in Fig. 5, that is controlled by a compass so that when two cars are travelling in opposite directions or meet at any but very sharp angles, the two filters or other protective devices of each of them will be automatically set in opposite colors. A compass suitable for use in such an automatic form of my invention is shown in Figures 6 to 9. The compass box proper 68 is set in, the usual gimbals consisting of a stationary ring 69 carrying pivots 70, which support a ring 71 carrying pivots 72 which are at right angles to the pivots 70, the box itself being supported by the pivots 72. The compass 68 is preferably mounted on the under side of the roof or cover of the car, as shown in Figures 1 and 2, to remove it from the large mass of magnetic metal which is in the lower portion of the car. The compass needle 73 is mounted on a central pivot 74 carried by the compass box, and the needle carries a disk 75 on the under side of which is hung a non-magnetic metal bridge 76 that is balanced by a non-metallic counter-weight 77 on the opposite side of the disk. The bridge hangs above a ring 78 that is mounted on the bottom of the compass box that is surrounded by two half-rings 79 and 80. The bridge 76 does not touch the ring and half-rings, as the magnetic pull of the needle would not be sufficient to overcome the friction of touching, but the bridge is spaced sufficiently above them to avoid touching, and I use a current of sufficient voltage to jump from the rings to the bridge and vice versa.

In the diagram shown in Fig. 5, which illustrates the automatic form of my mechanism, the stationary contacts 59a and 60a correspond to the stationary contacts 59 and 60 of Fig. 4, and all that diagram from the stationary contacts and reading to the right corresponds exactly with that shown in Fig. 4 and will not therefore again be described in detail. In the said Fig. 5, a motor 81 rotates a commutator 82 as by a worm and worm wheel, making and interrupting the flow of current from the storage battery to a brush 83, so that the current flows periodically for short intervals; say for one-fifth of each second. The current is carried through the said brush to the make-and-break 84 of a spark coil 85, by which the voltage of the current is increased to a sufficient pressure to enable it to pass through the compass to the inner ring 78 to which it is conducted by a wire 86. The half-rings 79 and 80 are respectively connected by wires 79a and 80a to electromagnets 87 and 88, the opposite ends of whose windings are grounded. The armature 89 of a relay normally stands in a central position between the magnets 87 and 88 and between contacts 89 and 90, which latter are respectively connected with solenoids 91 and 92 whose plungers are connected with a lever 58a corresponding with the hand lever 58 of the diagram of Fig. 4. The spring supporting the armature 89 is connected with the positive pole of the storage battery.

In the operation of the automatic form of my mechanism, which is shown in Fig. 5, the compass needle, always pointing toward the north, maintains the bridge 76 in a constant relation to the pole, in the present instance pointing due east, and the changing direction of the car in effect causes the rings 78 and the half-rings 79 and 80 to rotate about the pivot 74 relatively to the bridge so that the bridge electrically connects the ring 78 with one or the other of the half-rings according as the car may be travelling one side or the other in a direction that is exactly east or west. Assuming that the bridge connects the ring 78 with the half-ring 79, the high tension current from the spark coil will pass by the wire 79a and energize the magnet 88, drawing the armature 89 against the contact 90, which in turn energizes the solenoid 91, drawing the left-hand end of the lever 58a down and causing its right-hand end to make contact with the stationary contact 59a. This will enable the current from the positive pole of the battery to flow from the fulcrum of the lever 58a through the said lever and through the wire 63a to the solenoids 48a and 12a, thus throwing the red portion of the filters in the head lights over the lamps so that they will project red light, and throwing the red filter in the filter box into position in front of the driver's eyes. A car coming in the opposite direction would, by the same means, have its bridge connecting the ring 78 with the half-ring 80 with the result that the green filters would be thrown into operative position on his car.

If the first-mentioned car should turn to a direction on the opposite side of the east, its bridge would connect the ring 78 with the half-ring 80 and the solenoids 47 and 12 would be connected, so that the green filters would be thrown into position. Thus, without any attention on the part of the drivers, their cars would practically always show lights of opposite colors. In Fig. 3 the form of the mechanism shown in Fig. 5 is illustrated with the storage battery 93 and its wiring for lighting shown, and with the motor 81, commutator 82, and relay and solenoids 91 and 92, and spark coil 85 all placed in a motor control box 94, a convenient position in the car of which is shown in Fig. 2.

The filter box 14 is preferably hinged to the top of the automobile as shown in Fig. 12 so that in the day time it may be swung upward and held out of the way by a spring catch 94.

In Figures 14 and 15 I have illustrated another arrangement of filters than the cylindrical filters shown in Fig. 13. In Figures 14 and 15 a series of bars of red and green filters 95 and 96 are mounted upon pivots 97 like the slats of blinds, the said filters being of a width so that when in a vertical position they will substantially completely fill the space between one pair of pivots and the next one, and the filters of each pair are placed at right angles to each other. Each pair of filters has an arm 98 that is pivoted to a vertical bar 99, so that by shifting the said bar up or down either the green or the red filter may be trained into vertical and therefore operative position.

It will be understood that the principles of my invention are very broad and, as before stated, are susceptible of embodiment in a great variety of ways, and I have merely illustrated what I consider to be the best forms thereof known to me. For instance, the color filter or other protective device might be adjustably arranged upon spectacles worn by the driver.

I claim:—

1. Means for lighting motor vehicles comprising complementary viewing filters, headlights having complementary projecting filters corresponding to said complementary viewing filters, and automatic means for putting one of said viewing filters into operative relation with the driver's eyes, and for causing light to be projected through the corresponding projecting filter according to the direction of travel of the vehicle.

2. Means for lighting motor vehicles comprising complementary viewing filters, headlights having projecting complementary filters corresponding to said complementary viewing filters, and automatic means for putting one of said viewing filters into operative relation with the driver's eyes, and for causing light to be projected through the corresponding projecting filter according to the direction of travel of the vehicle, and means for automatically putting the complementary viewing filter into operative relation with the driver's eyes, and causing light to be projected through the other projecting headlight filters when the vehicle changes its direction of travel.

3. In a motor vehicle the combination of complementary filters, electrical means for shifting said filters alternately into operative position, comprising a plurality of stationary contacts connected with said means, a source of supply of current, and a compass having a needle that carries a contact which, by the movement of the needle, may be brought near each of said stationary contacts, said compass contact being so positioned as not to normally touch said stationary contacts, and means for so stepping up the voltage of said current that it shall be capable of jumping the gap between said movable and stationary contacts.

4. In a motor vehicle the combination of complementary filters, electrical means for shifting said filters alternately into operative position, comprising a plurality of stationary contacts connected with said means, a source of supply of current, and a compass having a needle that carries a contact which, by the movement of the needle, may be brought near each of said stationary contacts, said compass contact being so positioned as not to normally touch said stationary contacts, and means for so stepping up the voltage of said current that it shall be capable of jumping the gap between said movable and stationary contacts, said compass being mounted on the roof of the motor vehicle.

5. Means for lighting motor vehicles comprising a headlight, oppositely colored filters therefor, electrical means for shifting one or the other of said filters into operative position, similarly colored filters for the driver's eyes and electrical means for shifting one or the other of said filters into operative position, a compass having a movable contact connected with a source of relatively high tension current, stationary contacts adapted to cooperate with said movable contact but that are spaced therefrom, and a relay that is connected with said stationary contacts on one side and with said means for shifting said filters on the other side.

6. In a motor vehicle the combination of oppositely colored filters, electrical means for shifting said filters alternately into operative position, comprising a plurality of stationary contacts connected with said means, a source of supply of current, and a compass having a needle that carries a contact which, by the movement of the needle, may be brought near each of said stationary contacts, said compass being so positioned as not to normally touch said stationary contacts, and a spark coil for stepping up the voltage of said current so that the current shall be capable of jumping the gap between said movable and stationary contacts, said compass being mounted on the roof of the motor vehicle.

In testimony that I claim the foregoing, I have hereunto set my hand this 27th day of June, 1924.

KARL D. CHAMBERS.